United States Patent [19]

Watanabe

[11] Patent Number: 4,582,157
[45] Date of Patent: Apr. 15, 1986

[54] SUSPENSION AND DRIVE ARRANGEMENT FOR THREE WHEEL VEHICLE

[75] Inventor: Hiromitsu Watanabe, Iwata, Japan

[73] Assignee: Yamaha Hatsudoki Kabushiki Kaisha, Japan

[21] Appl. No.: 455,583

[22] Filed: Jan. 4, 1983

[30] Foreign Application Priority Data

Jan. 6, 1982 [JP] Japan ............................. 57-16973
Feb. 9, 1982 [JP] Japan ............................. 57-18173
Feb. 16, 1982 [JP] Japan ............................. 57-23366
Feb. 16, 1982 [JP] Japan ............................. 57-23367
Mar. 5, 1982 [JP] Japan ............................. 57-33757

[51] Int. Cl.$^4$ ............................................. B62D 61/02
[52] U.S. Cl. ..................................... 180/215; 180/217
[58] Field of Search ............... 180/210, 215, 217, 226, 180/227, 230; 280/204, 503, 284

[56] References Cited

U.S. PATENT DOCUMENTS

| | | | |
|---|---|---|---|
| 3,387,859 | 6/1968 | McClellan | 280/204 |
| 3,776,353 | 12/1973 | Roth | 180/215 |
| 4,058,181 | 11/1977 | Buell | 280/284 |
| 4,336,859 | 6/1982 | Leitner | 180/227 |
| 4,373,601 | 2/1983 | Onda et al. | 180/230 |
| 4,392,536 | 7/1983 | Iwai et al. | 180/227 |
| 4,463,964 | 8/1984 | Takayanagi et al. | 180/227 |

Primary Examiner—Joseph F. Peters, Jr.
Assistant Examiner—Kenneth R. Rice
Attorney, Agent, or Firm—Ernest A. Beutler

[57] ABSTRACT

Several embodiments of improved three wheel vehicles particularly adapted for off the road use. In each embodiment, the rear wheels are suspended by a suspension system that includes a suspension element that has its line of action is disposed at a relatively shallow angle to the horizontal so as to provide a long suspension travel. A trailing arm assembly is provided in each embodiment for suspending the rear wheels. The trailing arm assembly includes a pair of spaced apart arm members that are pivotally supported by a frame at their forward end. The pivot points of the arm members on the frame are transversely spaced apart a distance substantially equal to the width of the vehicle so as to improve stability. In some embodiments, a shaft drive is incorporated that passes through one arm of the arm members. In some embodiments, the suspension element is offset from the longitudinal axis of the vehicle toward the side opposite that on which the shaft drive is located. A trailer hitch is disclosed in one embodiment that is carried by the trailing arm so that the weight of the trailer will be carried by an unsprung portion of the vehicle. The engine incorporates an integral transmission and is disposed so that the drive shaft of the engine and the primary and secondary shafts of the transmission extend transversely to the longitudinal axis of the vehicle.

45 Claims, 16 Drawing Figures

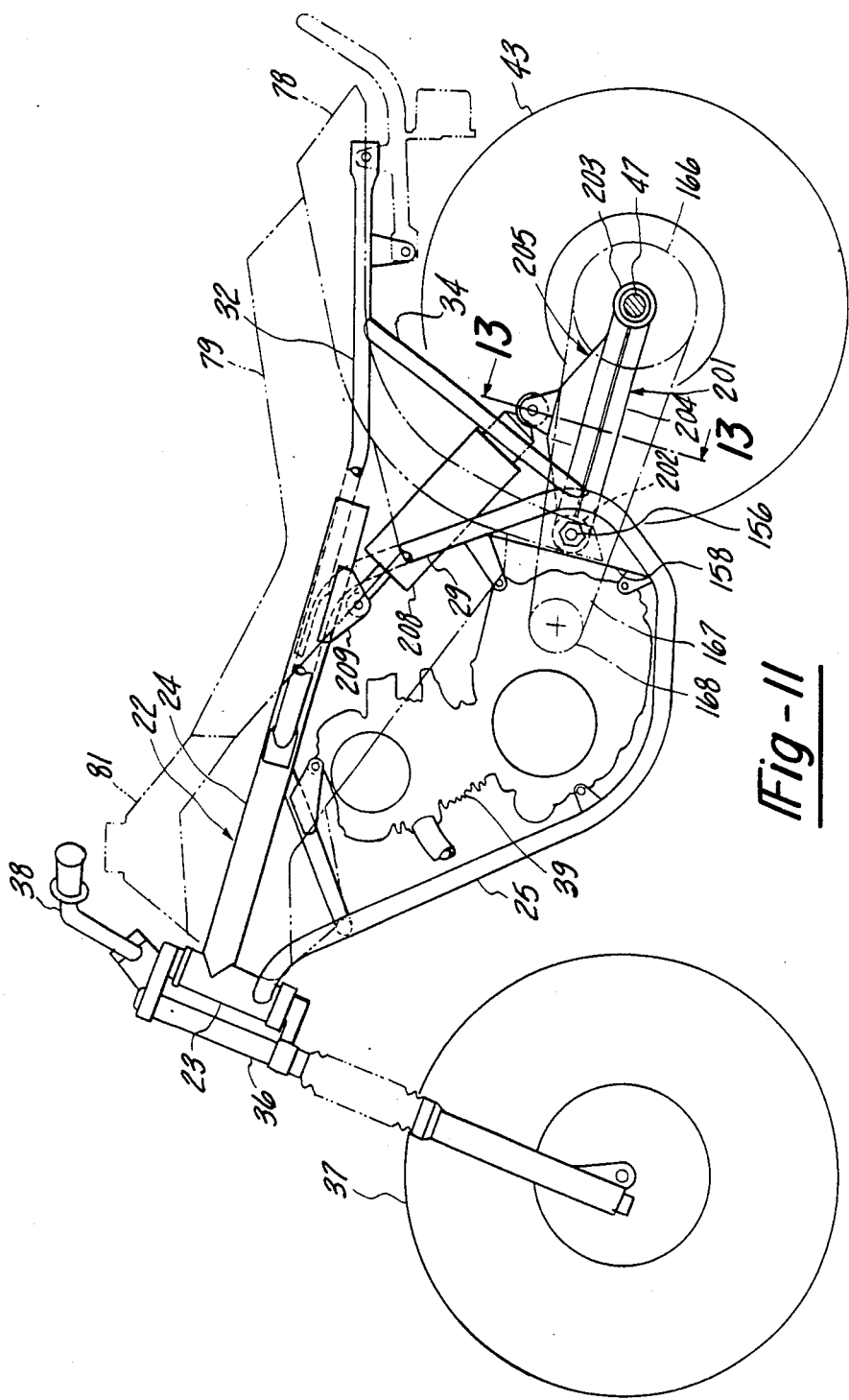

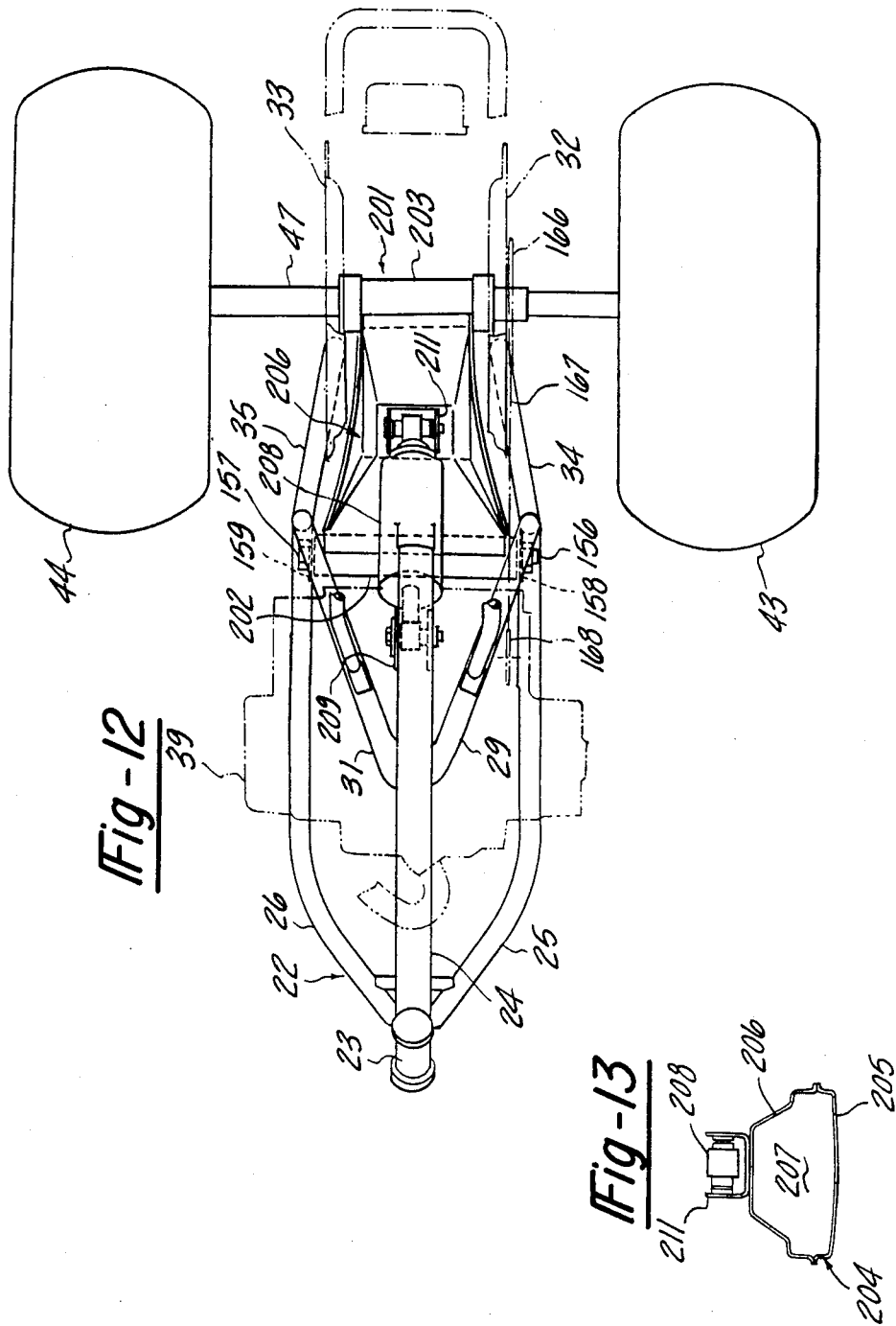

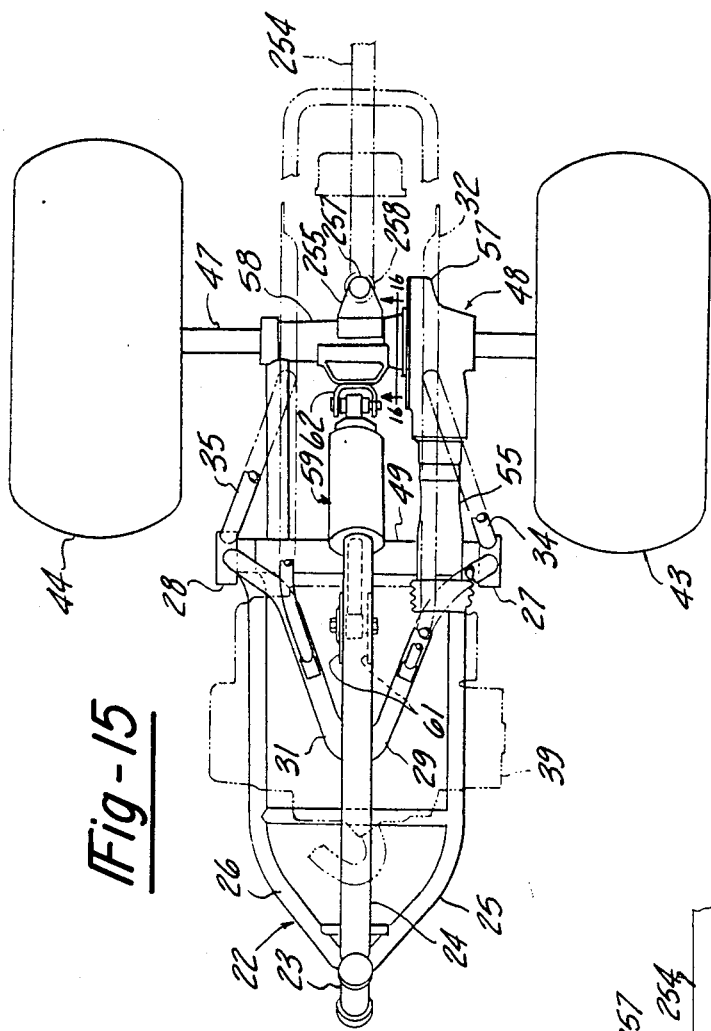
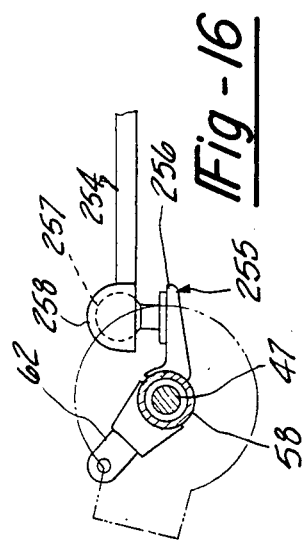

SUSPENSION AND DRIVE ARRANGEMENT FOR THREE WHEEL VEHICLE

BACKGROUND OF THE INVENTION

This invention relates to a suspension and drive arrangement for three wheel vehicles and more particularly to improvements in the suspension and driving arrangement for such vehicles that improve their utility and their stability in a wide variety of off the road applications.

Recently, the use of three wheel vehicles for off the road use has gained considerable popularity. Such vehicles are used for a wide variety of purposes including recreational purposes and are operated over a wide variety of terrains. Such vehicles initially did not employ any suspension system but merely relied upon their large balloon type, low pressure tires to afford some comfort for the operator. However, due to the wide variety of terrain over which these vehicles are operated and the extreme variations in grade, it has been proposed to employ a suspension system, particularly for the driven rear wheels to improve their stability and further add to their utility. Although in some regards these vehicles resemble motorcycles, the suspension and drive arrangement employed in conjunction with motorcycles are not particularly adaptable to three wheel vehicles due to the significant differences in their construction and the terrain over which they are operated.

It is, therefore, a principal object of this invention to provide an improved three wheel off the road vehicle.

It is another object of this invention to provide a suspension system for an off the road vehicle which will significantly add to the utility of the vehicle and its stability over widely varying terrains.

Although the advantages of employing a suspension system in three wheel vehicles has been well recognized, there has been some reluctance to incorporate a suspension system in this type of vehicle. One difficulty in conjunction with the provision of a suspension system for a vehicle of this nature is that the extreme compact nature of the vehicle makes the use of conventional suspension systems employed with pairs of driven wheels not applicable or unsatisfactory. That is, although the rear axle and driving arrangement of such off the road three wheel vehicles generally resembles the driving arrangement of an automobile having a live rear axle, automotive type suspension systems are not particularly adaptable to use in three wheel vehicles. Even compact automobiles have relatively large spaces available for the suspension components and can provide for substantial amounts of suspension travel with conventional suspension arrangements. With an off the road vehicle, it is particular important to provide a suspension system that permits wide degrees of suspension travel due to the wide varieties and types of terrains over which the vehicle is operated. However, the extremely compact nature of these vehicles has, heretofore, made such large suspension travels unobtainable.

It is, therefore, a still further object of this invention to provide a suspension system for a three wheel vehicle that accommodates substantial suspension travel without increasing the size of the vehicle.

It is another object of this invention to provide an improved, compact suspension system for a three wheel vehicle that permits large suspension movements.

Due to the wide varieties of usage to which off the road three wheel vehicles are put, it is desirable to provide a transmission system having a plurality of ratios for such vehicles. The use of transmission systems obviously adds to the utility of the vehicle. However, when a suspension system is employed for the driven wheels, it is extremely difficult to provide a multi-speed transmission.

It is, therefore, a still further object of this invention to provide a compact, highly effective multi-speed transmission and drive arrangement for a three wheel vehicle.

It is another object of this invention to provide an improved suspension drive and transmission arrangement for a three wheel vehicle that permits suspension movement of the driven wheels.

Due to the compact nature of off the road three wheel vehicles, it has been normally the practice to drive the rear wheels by means of either a drive shaft or a driving chain that is offset from the center line of the vehicle. With such an arrangement and considering the compact nature of these vehicles, such offset drives tend to provide unbalance in the driving and suspension arrangement of the vehicle. That is, the offset of the driving mechanism to one side of the vehicle tends to unbalance the weight of the vehicle and can provide unsatisfactory ride.

It is, therefore, still another object of this invention to provide an improved driving and suspension arrangement for a three wheel vehicle that improves stability.

It is another object of this invention to provide a suspension and drive arrangement for a compact three wheel vehicle in which the suspension system compensates for the offset of the drive arrangement.

In suspension systems for driven live axles carrying pairs of wheels, such as automotive applications, it has been the common practice to provide a suspension element consisting of a spring and/or shock absorber at each side of the axle contiguous to the respective driven wheel. Although such arrangements maybe be used in conjunction with three wheel vehicles, as aforenoted, the compact nature of these vehicles does not always permit the use of such suspension systems. It has been found practical to employ a single suspension element for the rear wheels of off the road three wheel vehicles in lieu of the pairs of suspension elements used in conventional automotive type suspension systems. However, when such an arrangement is employed, the element that carries the wheel and which transmits the load to the suspension element must be sufficiently strong so as to insure against breakage. One form of suspension system employed for such vehicles employs a trailing arm for suspending the rear axle. If the trailing arm is used to load the suspension element, it must be of sufficient strength so as to insure against breakage, considering particularly the extreme usage to which such vehicles are put.

It is, therefore, a further object of this invention to provide an improved trailing arm construction for three wheel vehicles.

Because of the compact nature of off the road three wheel vehicles of the type described, it has been found necessary in some instances to employ an arrangement wherein additional loads may be carried by such vehicles. Although various carriers have been proposed for such vehicles, they do not always provide sufficient capacity or optimum utility for load carrying purposes. It has, therefore, been proposed to employ the use of trailers with such vehicles. However, due to the wide variety of terrain over which such vehicles are operated, previously proposed trailer hitches have not been particularly satisfactory due to the wide variety of loadings which they can impose upon the suspension system of the vehicle.

It is, therefore, a further object of this invention to provide an improved trailer hitch arrangement for an off the road three wheel vehicle that does not affect the suspension system of the vehicle.

SUMMARY OF THE INVENTION

A first feature of this invention is adpated to be embodied in a three wheel vehicle or the like that includes a frame, a front wheel supported by the frame for steering movement, a pair of rear wheels, and trailing arm means for supporting the rear wheels for rotation at the rear end of the trailing arm means. The trailing arm means comprises a pair of transversely spaced apart arm members. In accordance with this feature of the invention, the frame defines a pair of transversely spaced apart pivot means contiguous to the outer periphery of the vehicle for pivotally supporting the forwardmost portion of the arm members of the trailing arm means about widely spaced pivot points for imparting stability to the vehicle.

Another feature of the invention is also adapted to be embodied in a three wheel vehicle or the like that includes a frame, a front wheel dirigibly supported by the frame, a pair of rear wheels and suspension means for suspending the rear wheels for movement relative to the frame. In conjunction with this feature of the invention, the suspension means comprises at least one cushioning element operating along an axis that is disposed at a relatively shallow angle to the ground when the vehicle is unladened.

Still another feature of the invention is adapted to be embodied in a drive arrangement for a wheeled vehicle having frame means, an engine supported by the frame means, a pair of rear wheels, and a trailing arm suspension means for suspending the rear wheels from the frame means and comprising a pair of spaced apart arm members pivotally supported by the frame means. In accordance with this feature of the invention, a change speed transmission is carried by the frame means and has its primary and secondary shafts extending transversely to the longitudinal axis of the vehicle. A drive shaft extends through one of the trailing arm members. A final drive transmits drive from the drive shaft to the rear wheels. Means drive the drive shaft from the transmission secondary shaft including a universal joint positioned in alighment with the pivot axis of one of the arm members. Change speed gearing means interconnects the primary and secondary shafts of the transmission means so as to provide a varying speed transmission ratio between the shafts.

Another feature of this invention is adapted to be embodied in a wheeled vehicle that includes a frame, an engine supported by the frame, a pair of rear wheels, and drive means for driving the rear wheels from the engine. The drive means includes a final drive element extending to one side of the longitudinal axis of the vehicle and suspension means suspend the rear wheels for movement relative to the frame. In accordance with this feature of the invention, the suspension means includes a single suspension element for cushioning the movement of the rear wheels relative to the frame. This single suspension element is offset from the longitudinal axis of the vehicle on the side opposite to the final drive element.

Another feature of this invention is adapted to be embodied in a trailing arm suspension for the rear wheel of a three wheel vehicle or the like. The trailing arm includes a pair of transversely spaced apart arm members that are adapted to be pivotally supported at their forward end from a frame assembly and which are adapted to rotatably support an axle at their rearward ends. Reinforcing means interconnect the arm members. In accordance with this feature of the invention, the reinforcing means carries a means for providing attachment to a suspension element that is positioned between the pivotal axis of the arm members and the axis of rotation of the axle and which is spaced vertically from a line interconnecting said axes.

Yet a further feature of this invention is adapted to be embodied in a three wheel vehicle that includes a frame, a dirigible front wheel carried by the frame, a pair of rear wheels, drive means for driving the rear wheels from the engine and suspension means for suspending the rear wheels for movement relative to the frame. In accordance with this feature of the invention, a trailer hitch is carried by an unsprung component of the vehicle for facilitating attachment of a trailer to the vehicle.

BRIEF DESCRIPTION OF THE DRAWINGS

FIG. 11 is a side elevational view, in part similar to FIG. 1, of a further embodiment of the invention, with portions shown in phantom.

FIG. 12 is a top plan view of the embodiment shown in FIG. 11, with certain components eliminated and other components shown in phantom.

FIG. 13 is a cross sectional view taken along the line 13—13 of FIG. 11.

FIG. 15 is a top plan view of a portion of the vehicle of the embodiment of FIG. 14 with certain components eliminated and other components shown in phantom.

FIG. 16 is an enlarged cross sectional view taken generally along the line 16—16 of FIG. 15 and shows the trailer hitch arrangement.

DETAILED DESCRIPTION OF THE PREFERRED EMBODIMENTS OF THE INVENTION

Embodiment Of FIGS. 1 Through 6

Figure 1:
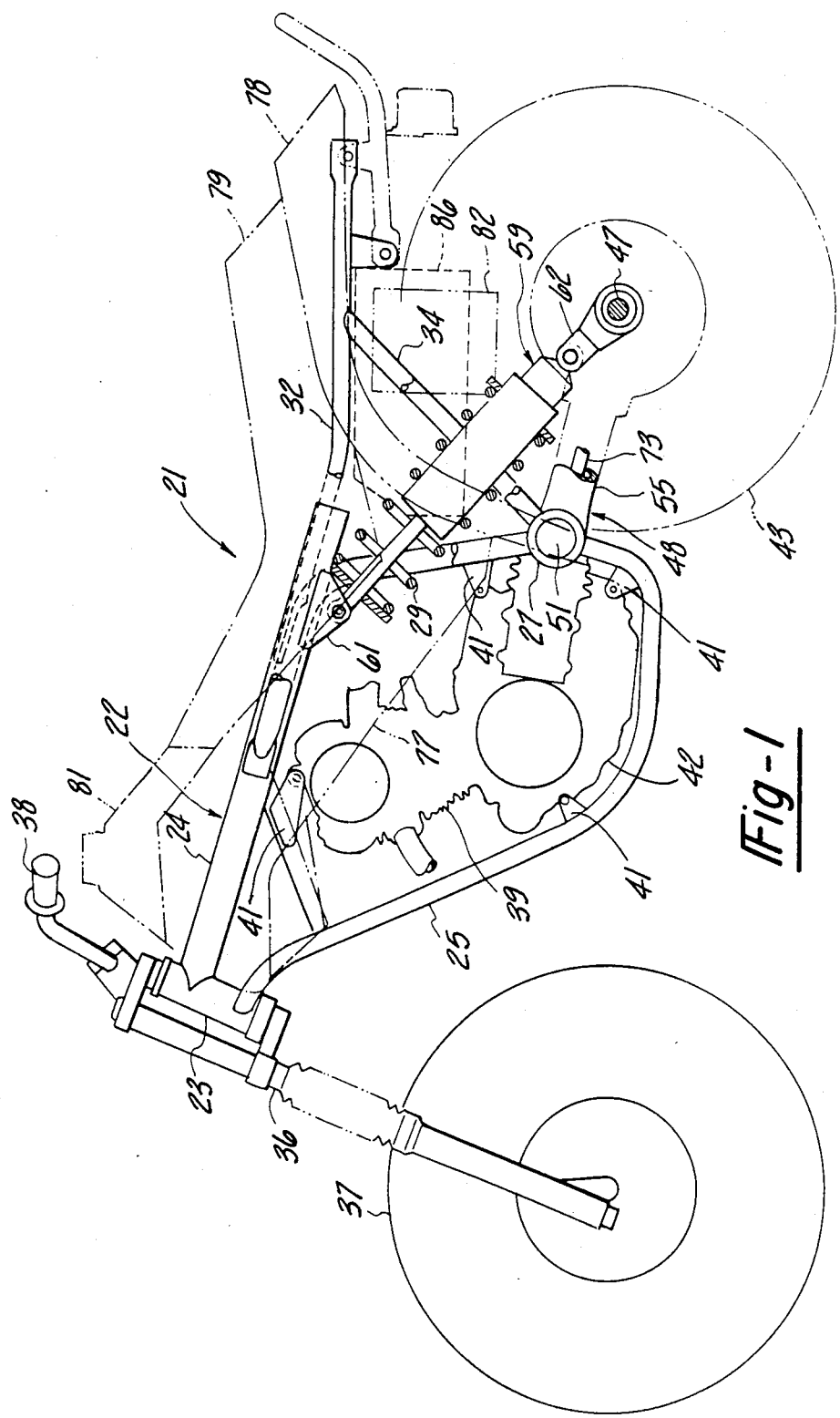
FIG. 1 is a side elevational view of a three wheel vehicle constructed in accordance with a first embodiment of the invention, with certain components shown in phantom and other parts broken away.
Figure 2:
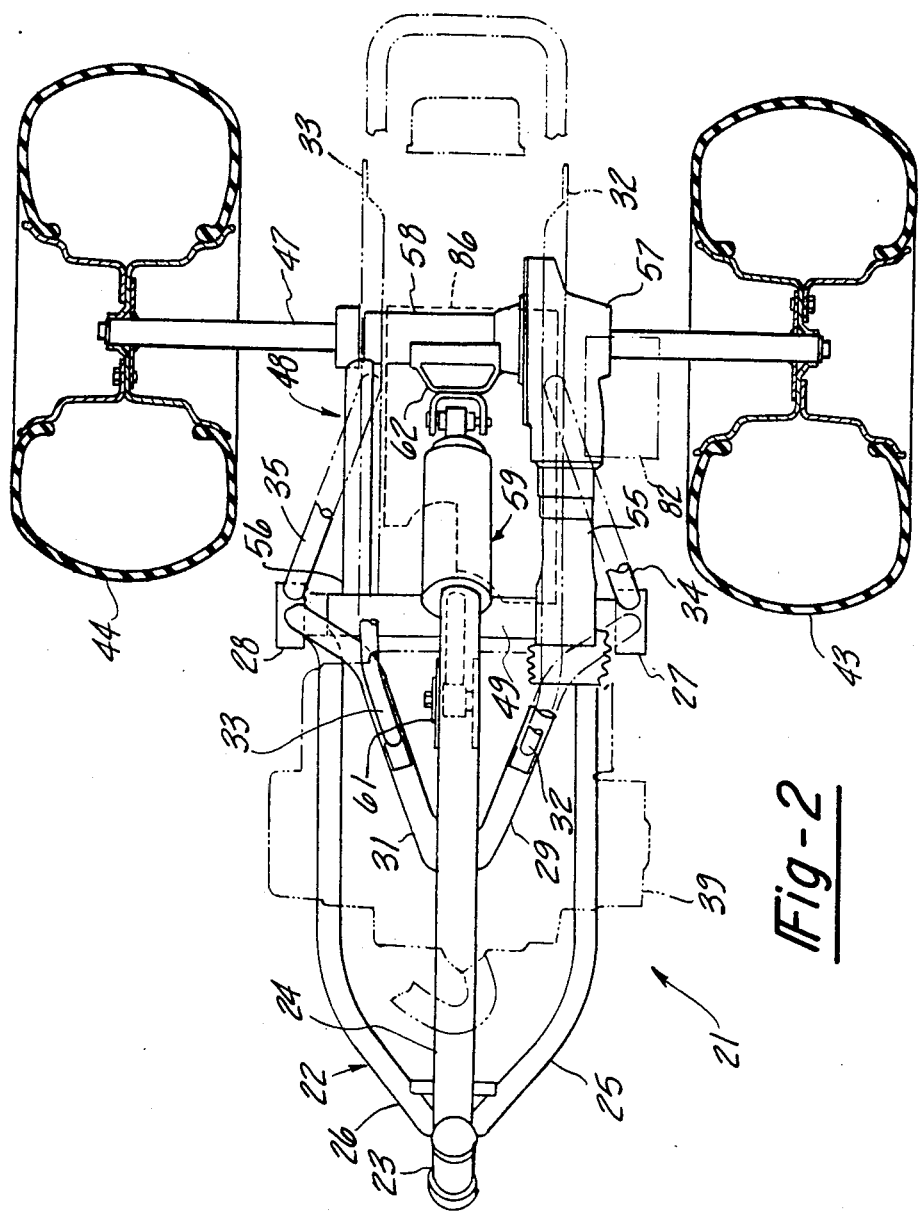
FIG. 2 is a top plan view of the vehicle shown in FIG. 1, with certain components removed and other components shown in phantom.
Figure 3:
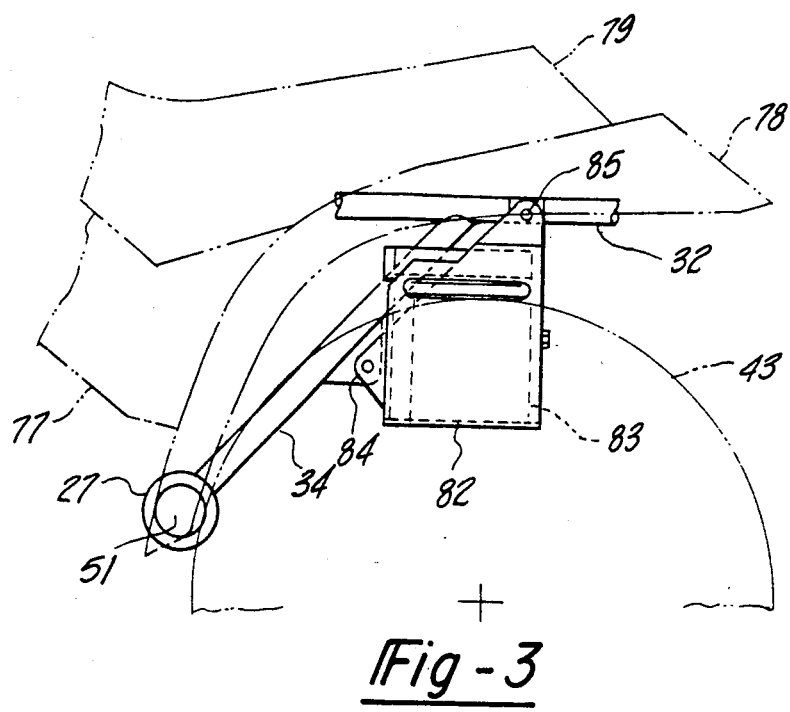
FIG. 3 is a side elevational view of the rear portion of the vehicle, in part similar to FIG. 1, showing some of the phantom portions of FIG. 1 in solid lines and other components in phantom.
Figure 4:
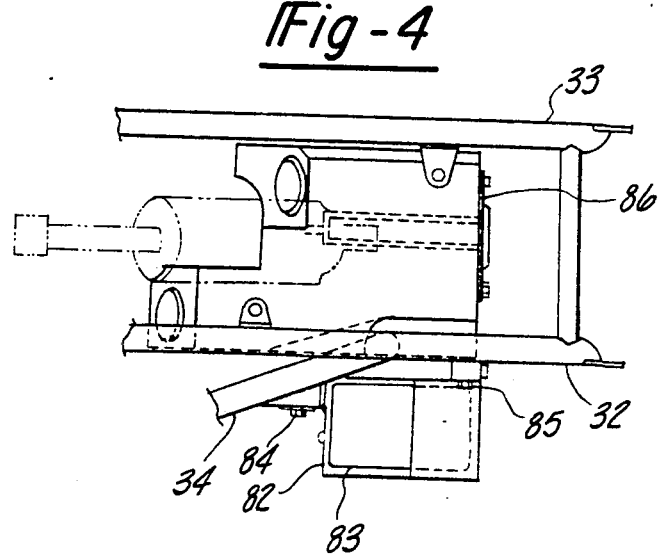
FIG. 4 is a top plan view of the portion of the structure shown in solid lines in FIG. 3.

A three wheel off the road vehicle constructed in accordance with a first embodiment of the invention is identified generally by the reference numeral 21. In some figures of the drawings, certain portions of the vehicle 21 have been illustrated in phantom and other portions have been deleted. This has been done to show more clearly the details of the construction relating to the invention.

The vehicle 21 includes a frame assembly, indicated generally by the reference numeral 22. The frame assembly 22 is, in the illustrated embodiment, made up of a welded tubular structure and includes a head pipe 23 to which a main pipe 24 is affixed, as by welding. The main pipe 24 extends rearwardly and downwardly at a slight angle to the horizontal. Also affixed to the head pipe 23 are a pair of down tubes 25 and 26 that extend downwardly and flare generally outwardly so as to provide a cradle like construction. The rear ends of the down tubes 25 and 26 extend upwardly and are again outwardly bent so as to be welded to a pair of spaced bearing members 27 and 28 for a purpose to be described. A pair of seat pillars 29 and 31 are affixed at their rear ends to the bearing members 27 and 28, respectively, and extend upwardly and inwardly toward the main tube 24. At their forward ends, the seat pillars 29 and 31 are affixed, as by welding, to an intermediate portion of the main tube 24.

A pair of seat rails 32 and 33 are affixed, as by welding, to an intermediate portion of the seat pillar tubes 29, 31, respectively, and extend rearwardly in a generally horizontal plane. Cross braces 34 and 35 extend upwardly from the bearing portions 27 and 28 and are affixed to the underside of the rear portions of the seat rails 32 and 33 so as to complete the frame assembly.

The head pipe 23 dirigibly supports a front fork assembly, indicated generally by the reference numeral 36 in a known manner. A low pressure type front wheel 37 is journalled and, if desired, supported for suspension movement by the front fork 36 in a known manner. A handlebar assembly 38 is carried at the upper end of the front fork assembly 36 for steering the front wheel 37 in a known manner.

The vehicle 21 is powered by an internal combustion engine, indicated generally by the reference numeral 39. The engine 39 may be of any known type, but in accordance with a feature of this invention, the engine 39 is positioned so that its output shaft rotates about an axis that extends transversely to the longitudinal axis of the vehicle 21 and frame 22. The engine 39 is supported in the frame assembly 21 in a known manner, as by means of one or more brackets 41 that are welded to appropriate components of the frame 22. The engine 39 has a crankcase 42 which encloses a change speed transmission assembly, as will become apparent.

A pair of low pressure tires 43 and 44 are carried by rear wheels 45, 46, respectively, which are in turn affixed to a rear axle shaft 47. The rear tires 43 and 44 are relatively widely spaced so as to give good stability to the vehicle 21.

The rear wheels 45 and 46 and axle 47 are supported for suspension movement relative to the frame assembly 21 by means of a trailing arm assembly, indicated generally by the reference numeral 48 and shown in most detail in FIGS. 1, 2, 5 and 6. The trailing arm assembly 48 includes a cross tube 49 that extends transversely across the frame 22 between the bearing members 27 and 28. The cross tube 49 is supported for pivotal movement relative to the bearing members 27 and 28 by means of a pair of stub shafts 51 and 52 that are journalled in the bearing members 27, 28, respectively, and which carry the cross tube 49 by means of spaced bearings 53 and 54. It should be noted that the bearings 53 and 54 and frame bearing portions 27 and 28 are very widely spaced and extend outwardly almost to the inner periphery of the tires 43 and 44. This improves both the strength and the lateral stability of the vehicle 21.

A pair of rearwardly extending arms 55 and 56 are affixed to the cross tube 49. The rear end of the arm 55 is affixed to a final drive housing 57 in a suitable manner. The final drive housing 57 is, in turn, affixed to a cross tube 58 which is, in turn, affixed to the rear end of the arm 56. Hence, a generally box shaped trailing arm construction is provided that rotatably journals the rear axle 47 and which provides adequate strength for this support.

It should be noted that the construction of the rear portion of the frame assembly 22 provides a generally open area, particularly along the mid plane of the vehicle 21. A suspension element, indicated generally by the reference numeral 59 extends through this open area at a substantial angle to the vertical and at a relatively shallow angle to the horizontal. The suspension element 59 may be of any known type and, in this embodiment, includes a hydraulic shock absorber and coil spring assembly. The forward end of this assembly is pivotally connected to the frame main tube 24 by means of a bracket 61. The rear end of the suspension element 59 is pivotally connected to a bracket 62 which is, in turn, affixed to the trailing arm cross tube 58. The suspension element 59 is constructed so that it will be loaded upon pivotal movement of the trailing arm assembly 48 relative to the frame assembly 22 so as to cushion the movement of the rear wheels 45 and 46 relative to the frame 22. Because of the angular positioning of the suspension element 59, it may act over a substantially long stroke and thus, afford a good ride and good suspension control over a wide variety of terrains.

Figure 5:
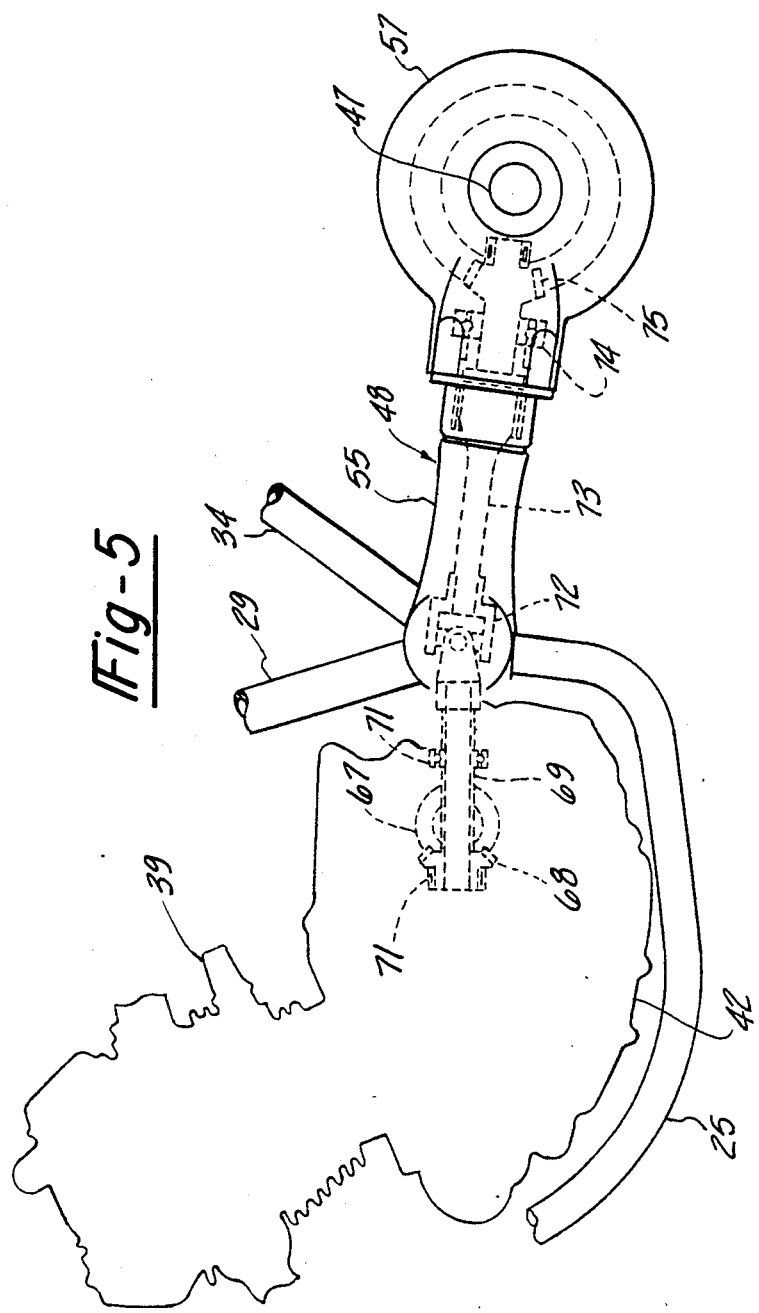
FIG. 5 is a side elevational view showing a portion of the drive train and associated components of the frame of the vehicle.
Figure 6:
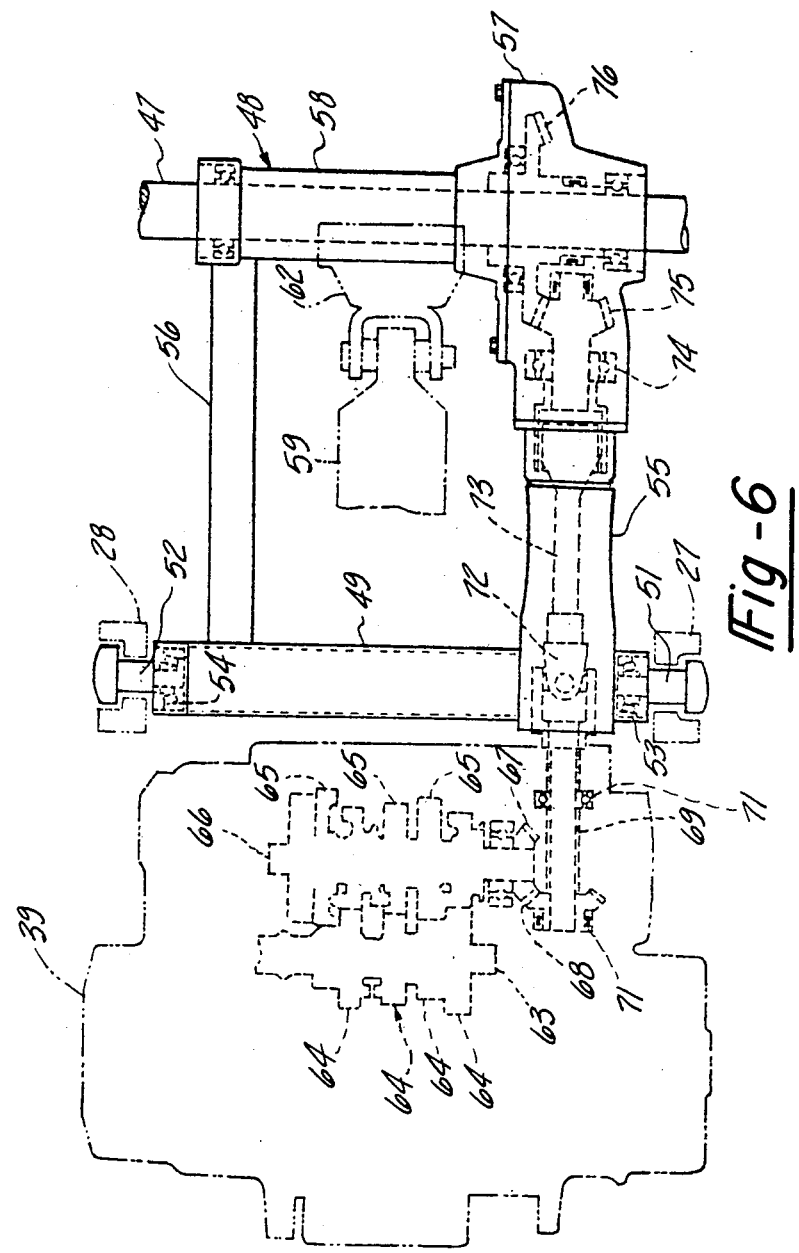
FIG. 6 is a top plan view of the portion of the drive train shown in FIG. 5, with components of the engine shown in phantom and in section.

The arrangement for transmitting the drive from the engine 39 to the rear wheels 45 and 46 will now be described with primary reference to FIGS. 5 and 6. As has been noted, the crankcase 42 encloses a change speed transmission and the engine 39 is positioned so that its output shaft extends transversely to the longitudinal axis of the vehicle 21. The change speed transmission incudes a primary shaft 63 that rotates about an axis that is transversely disposed to the longitudinal axis of the vehicle 21 and parallel to the output shaft of the engine 39. The primary shaft 63 is driven in a known manner from the engine 39 through a clutch (not shown). The primary shaft 63 has affixed for rotation with it a plurality of primary gears 64 of different pitches. These gears are in mesh with gears 65 that are journalled upon a secondary shaft 66 which is, rotatably journalled in a suitable manner within the crankcase 42 about an axis that is parallel to the axis of the primary shaft 63 and the engine output shaft. The gears 65 are adapted to be clutched to the secondary shaft 66 by means of a suitable shifting and synchronizing arrangement so as to change the relative speeds of rotation between the primary shaft 63 and secondary shaft 66 in a manner well known with change speed transmission assemblies.

A beveled driving gear 67 is affixed for rotation with the secondary shaft 66 and meshes with a driven bevel gear 68 that is affixed to a transmission output shaft in a known manner. The bevel gears 67 and 68 transmit the drive from the secondary shaft 66 to the output shaft 69 at a right angle. The output shaft 69 is journalled within the crankcase assembly 42 for rotation about an axis that is parallel to the longitudinal axis of the vehicle 21 and which is aligned with the trailing arm suspension arm 55. A pair of spaced bearings 71 are provided for rotatably supporting the transmission output shaft 69.

A universal joint 72 is positioned within the juncture between the cross tube 49 and the trailing arm arm portion 55 and is coupled to the transmission output shaft 69 in a known manner. The universal joint 72 is positioned so that one of its axes will lie on the pivot axis defined by the bearings 53 and 54 of the trailing arm assembly 48. The universal joint 72 in turn drives a drive shaft 73 that is journalled in the arm portion 55 by means including a bearing 74 positioned within the final drive housing 57. A driving pinion 75 is affixed to the rear end of the drive shaft 73 and meshes with a ring gear 76 that is affixed for rotation with the axle 47 for driving the axle 47 in a known manner.

A body of any known type and which may be formed from reinforced fiberglass or the like encloses a portion of the frame assembly 22 and some of the running components described. The body is shown in phantom in the figures and includes a main portion 77 that extends over the main tube 24 and partially around the engine 39. A pair of integral fenders 78 extend rearwardly from the body main portion 77 and overlie the rear tires 43 and 44. A seat 79 is also carried upon the body 77 and 78 and extends rearwardly from a fuel tank 81.

A battery case, indicated generally by the reference numeral 82 is carried at the rear portion of the vehicle 21 and encloses a battery 83. The battery case 82 may be supported in known manner, as by means of a bracket 84 that is affixed to the cross stay 34 and a bracket 85 that is affixed to the seat rail 32.

An air cleaner assembly 86 is carried at the rear portion of the frame 22 and is disposed between the rear tires 43 and 44. The air cleaner assembly provides a source of clean filtered air for the engine 39 through an appropriate conduit.

It should be readily apparent that the described construction permits an extremely compact yet highly stable and robust vehicle that may be readily used for off the road applications. The wide spacing of the pivot axis for the trailing arm assembly 48 insures good stability and the substantially horizontal positioning of the suspension element 59 permits a long suspension travel and accordingly good ride and effective suspension control.

Figure 7:
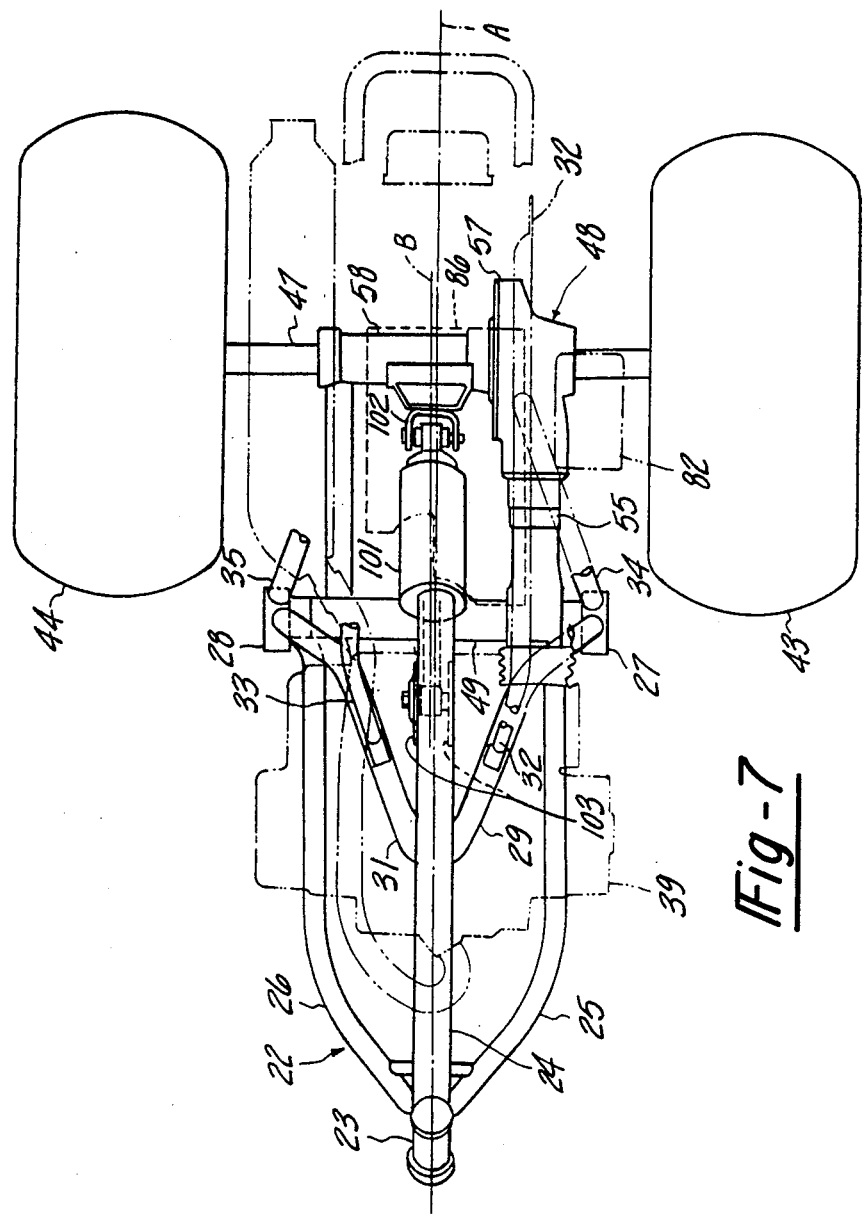
FIG. 7 is a top plan view, in part similar to FIG. 2, showing another embodiment of the invention.
Figure 8:
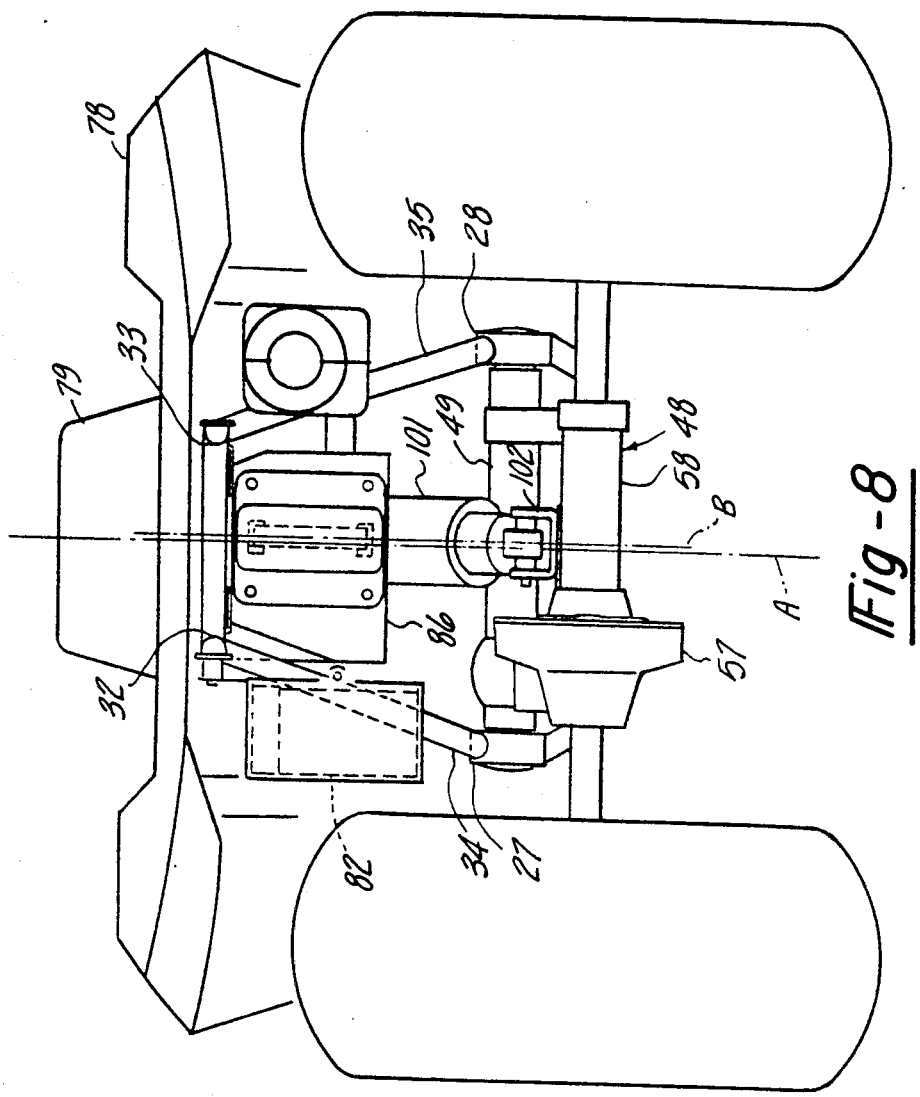
FIG. 8 is a rear elevational view of the embodiment shown in FIG. 7.

The Embodiment Of FIGS. 7 And 8

From the description of the embodiment of FIGS. 1 through 6, it should be readily apparent that the positioning of the drive shaft within one of the arms of the trailing arm construction which supports the rear wheels 45 and 46 provides an extremely compact assembly and, furthermore, one in which the final drive components are protected by the respective housings of the final drive. However, the positioning of these final drive elements on one side of the trailing arm assembly 48 causes one side of the vehicle 21 to have a slightly higher weight than the other. FIGS. 7 and 8 illustrate an embodiment wherein this weight unbalance is compensated for and wherein the rear suspension also accommodates the weight differences from one side to the other.

Turning now specifically to the embodiment of FIGS. 7 and 8, except for the positioning and loading of the suspension element, all components are the same as the embodiment of FIGS. 1 through 6. For this reason, all of the similar components have not been illustrated and even those elements which are illustrated will not be described again in detail. Where the components are the same as the previously described embodiment, the same reference numeral has been employed to identify them and reference may be had to the detailed description of the embodiment of FIGS. 1 through 6 for a description of their construction and operation.

The longitudinal center plane of the vehicle is identified by the line A in this figure. As should be readily apparent from the top and rear elevational views (FIGS. 7 and 8), the positioning of the drive shaft and final drive components at the one side of the plane A tends to cause a slight weight imbalance. In order to compensate for this, a suspension element, indicated generally by the reference numeral 101 is positioned so that it is offset from the plane A rather than lying on it as in the previously described embodiment. The suspension element 101 may, as in the previously described embodiment comprise a combined shock absorber and coil spring. The suspension element 101 is positioned so that it extends at the same angle to the horizontal as in the previously described embodiment. However, in this embodiment, a bracket 102 is affixed to the rear suspension cross tube 58 and provides a pivotal connection to the suspension element 101 that is offset from the plane A to the side opposite the final drive 57. In a like manner, a pair of offset brackets 103 are affixed to the main tube 24 so that the pivotal connection provided between these brackets 103 and the upper end of the suspension element 101 is also offset from the plane A. The offsetting is such that a line of action along which the suspension element 101 acts lies in a plane, indicated by the reference character B. The plane B is offset from the plane A on the side opposite the final drive 57 to an amount equal to offset the weight of the final drive and to provide an uniform loading on the suspension element 101.

Figure 9:
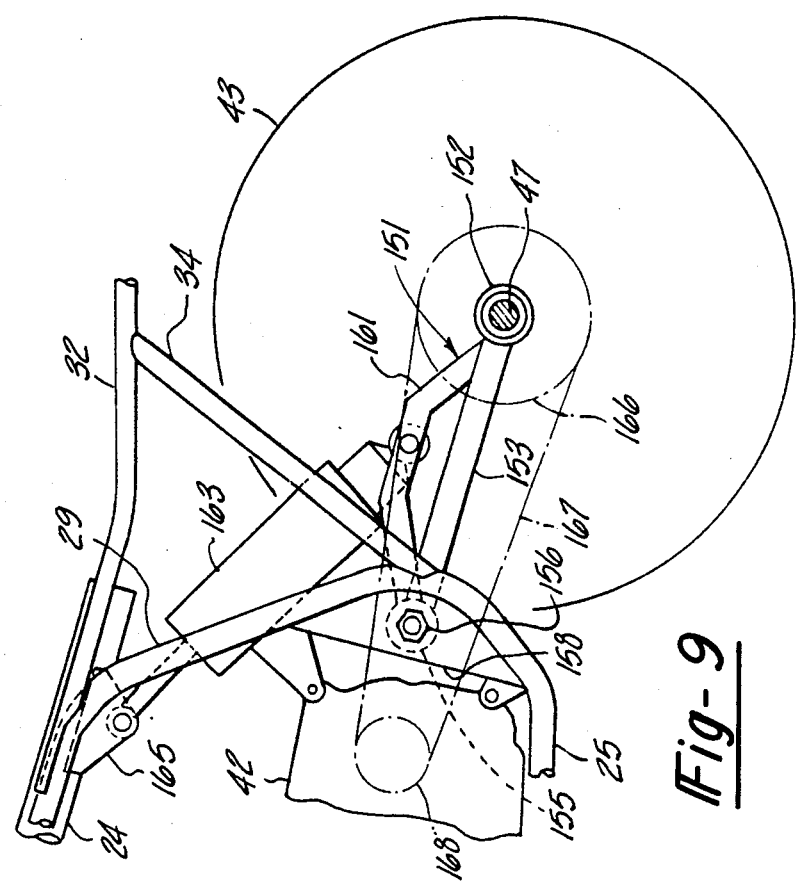
FIG. 9 is a side elevational view of the rear portion of a vehicle constructed in accordance with another embodiment of the invention.
Figure 10:
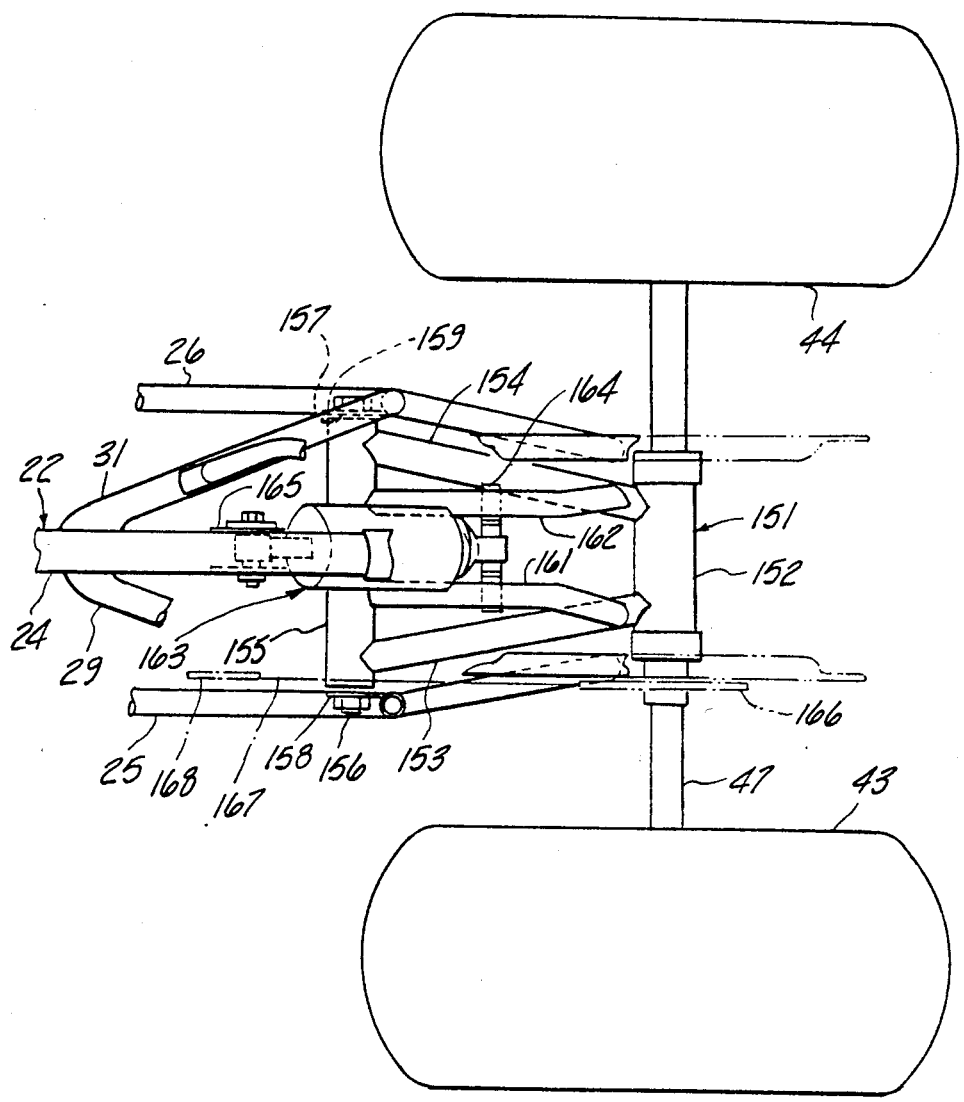
FIG. 10 is a top plan view of the rear wheel construction of the embodiment of FIG. 9.

The Embodiment Of FIGS. 9 And 10

In the embodiments previously described, the vehicle has been powered by means of a shaft drive. Certain features of the invention may, however, be embodied in a vehicle wherein the rear wheels are driven by means of a chain and sprocket assembly. In accordance with such an arrangement, it is still desirable to employ a trailing arm suspension and one in which the suspension element is disposed at a substantial angle to the vertical so as to afford wide suspension travel. In addition to the positioning of the suspension element in this orientation, the trailing arm suspension should be particularly robust so as to accommodate the loads experienced with off the road vehicles. Such an arrangement will now be described by reference to FIGS. 9 and 10 wherein a chain drive embodiment of the invention is disclosed.

In FIGS. 9 and 10, only the rear suspension arrangement and final drive has been illustrated since, in all other regards, this embodiment may be considered to be the same as the previously described embodiments. Components of the frame which are the same or substantially the same as in the previously described embodiments have been identified by the same reference numerals and will not be described again in detail.

In this embodiment, the rear axial 47 which supports the rear wheels and rear tires 43 and 44 is journalled and supported for suspension movement by a fabricated trailing arm assembly indicated generally by the reference numeral 151. Trailing arm assembly 151 includes a rear cross tube 152 that journals the rear axle 47 in a known manner. A first pair of transversely spaced apart tubes 153 and 154 are affixed, as by welding, at their rear ends to the cross tube 152 and extend forwardly and outwardly. This first pair of tubes 153, 154, is affixed, as by welding, to a forwardly disposed cross tube 155. The forward cross tube 155 is pivotally supported by the frame assembly in a suitable manner, as by means of pivot pins 156 and 157. The pivot pins 156 and 157 are carried by plates 158 and 159 that are welded to the frame assembly where the down tubes 25, 26, join the seat pillar rails 29, 31.

A second pair of tubes 161, 162, of generally inverted U shaped configuration are affixed to the tubes 153, 154, at one end and to the cross tube 155 at their other end. Tubes 161, 162, provide reinforcing for the trailing arm assembly 151 and, further, afford an arrangement for facilitating attachment to the suspension element, as will be described.

As with the previously described embodiment, a single suspension element, indicated generally by the reference numeral 163, is provided for cushioning the movement of the rear tires 43, 44, relative to the frame assembly. As with the previously described embodiments, the suspension element 163 is a combined shock absorber, coil spring and is disposed at a substantial angle to the vertical and at a relatively small angle to the horizontal. As a result, the suspension element 163 can be positioned in the generally open rear area of the frame and also can operate over a relatively long stroke. The lower end of the suspension element 163 is pivotally connected to a cross pin 164 that spans the tubes 161, 162 and which is detachably connected to them. The upper end of the suspension element 163 is pivotally connected to the frame by means of a bracket assembly 165 that is affixed, as by welding, to the rear portion of the main tube 24. Therefore, it should be readily apparent that pivotal movement of the trailing are assembly 54 will cause loading of the suspension element 163.

As has been previously noted, this embodiment is chain driven. Therefore, a driven sprocket 166 is affixed against rotation in a suitable manner to the rear axle 47. A driving chain 167 encircles the driven sprocket 166 and a driving sprocket 168 that is affixed to the output shaft of the transmission contained within the combination crankcase transmission assembly 42. The transmission may be of any known type and preferably is of the type as described in conjunction with the embodiment of FIGS. 1 through 6. However, is should be readily apparent that the output shaft of the transmission will extend transversely to the longitudinal axis of the vehicle in this embodiment since a drive shaft is not employed as in the previously described embodiment.

The Embodiment of FIGS. 11 Through 13

In the embodiment of FIGS. 9 and 10, the trailing arm assembly for the chain driven rear wheels 43 and 44 was fabricated from a tubing assembly. It is also possible, in accordance with a feature of the invention, to employ a fabricated trailing arm assembly which is formed from a box like sheet metal construction. Such an embodiment is shown in these two figures. Insofar as the general construction of the frame and driving arrangement is concerned, the embodiment is the same as the embodiment of FIGS. 9 and 10 and, for that reason, components which are the same or substantially the same as the previously described embodiments have been identified by the same reference numerals and detailed description of these elements will not be repeated.

In this embodiment, the rear axle 47 and rear wheels and tires 43, 44, are supported by means of a fabricated trailing arm assembly, indicated generally by the reference numeral 201. The trailing arm assembly 201 includes a forward tube 202 and a rearward tube 203. The forward tube 202 is pivotally supported on the frame brackets 158 and 159 by means of pivot bolt assemblies 156 and 157 as in the embodiment of FIGS. 9 and 10. In a similar manner, the rear tube 203 rotatably journals the rear axle 47 in any suitable manner. The tubes 202 and 203 are interconnected by means of a box like construction, indicated generally by the reference numeral 204. The construction 204 is formed from sheet metal or the like and has a cross sectional configuration as shown in FIG. 13. This construction is made up of a lower piece 205 and an upper piece 206 which pieces are connected together in a crimped and welded fashion along their peripheral edge. The box construction 204 provides a generally open interior space 207. However, because of the box like construction, the arm 201 will have high rigidity.

A suspension element, indicated generally by the reference numeral 208 is provided for cushioning the pivotal movement of the trailing arm assembly 201. The suspension element 208 is, as in the previously described embodiments, a combined hydraulic shock absorber and coil spring arrangement that has its line of action disposed at a substantial angle to the vertical and at a relatively shallow angle to the horizontal to provide a long line of action. The forward end of the suspension element 208 is pivotally connected to the frame main tube 204 by means of a bracket 209. The upwardly extending portion of the box assembly 204 carries a bracket 211 to which the rear end of the suspension element 208 is pivotally connected in a known manner. Thus, is should be readily apparent that upon pivotal movement of the trailing are assembly 201 about the pivot pins 156 and 157, the suspension element 208 will be loaded as in the previously described embodiments.

Figure 14:
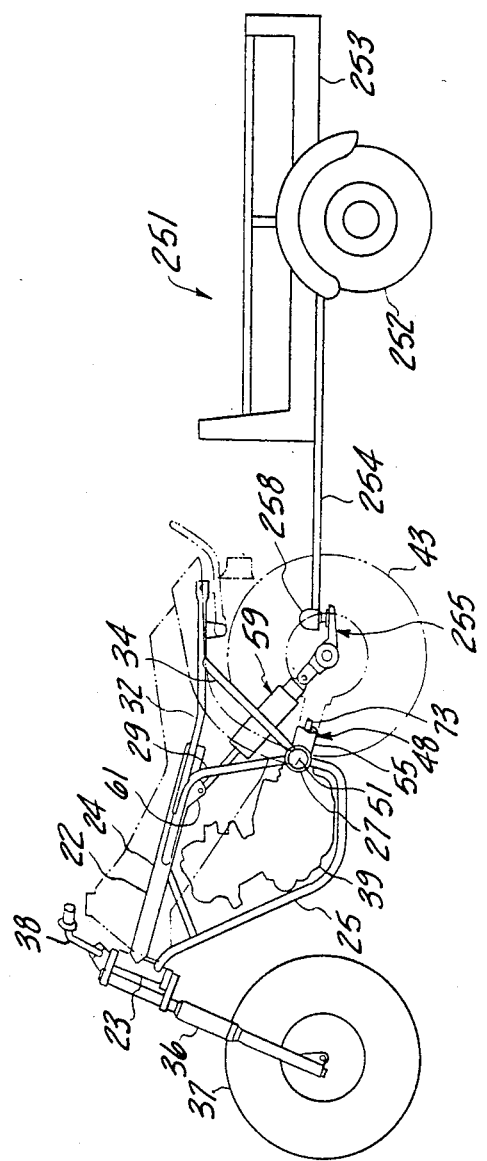
FIG. 14 is a side elevational view of a further embodiment of the invention showing the application of a trailer hitch to a three wheel vehicle.

The Embodiment Of FIGS. 14 Through 16

The off the road and general utility nature of three wheel vehicles of the type as described in each of the preceding embodiments frequently gives rise to the desirability to haul a trailer with the vehicle. Heretofore, it has been the practice of providing a trailer hitch on the body of the vehicle through which media the trailer is hauled. Such arrangements, however, cause loading of the suspension of the vehicle in relation to the amount of load in the trailer and can adversely affect their handling. Furthermore, when operated in an off the road condition and carrying heavy loads, the loading of the suspension system through a trailer attached in this manner can be particularly undesirable.

FIGS. 14 through 16 illustrate an embodiment wherein a trailer may be hauled conveniently and safely without adversely affecting the vehicle. In these embodiments, the vehicle is of the general type as shown in the embodiments of FIGS. 1 through 6 and employs the offset shock absorber arrangement as in the embodiments of FIGS. 7 and 8. It is to be understood, however, that the application of the principles of this embodiment can be employed with vehicles of the type as disclosed in any of the other embodiments or, in fact, for vehicles having other constructions than those of the illustrated embodiment. In view of the similarity of this embodiment to the previously described embodiments, components which are the same as the previously described embodiments have been identified by the same reference numeral and will not be described again in detail.

Referring now specifically to this embodiment, the powered vehicle is particularly adapted to haul a trailer, indicated generally by the reference numeral 251. The trailer 251 has one or more ground engaging wheels 252 that carry a bed 253 by means of a suitable suspension system. A tongue 254 is affixed to the bed 253 and extends forwardly for attachment to the vehicle.

In accordance with this invention, a trailer hitch assembly, indicated generally by the reference numeral 255 is affixed to the trailing arm of the rear wheels 43, 44 of the vehicle. By affixing the trailer hitch 255 to the trailing arm assembly and particularly in proximity to the rear axle 47, the load of the trailer is borne directly by the wheels of the vehicle and not transmitted to its suspension system.

The trailer hitch 255 has a rearwardly extending portion 256 to which a ball 257 is affixed in any known manner. The forward end of the tongue 254 carries a ball receiver 258 that cooperates with the ball 257 so as to couple the trailer 251 to the hitch 255.

Summary

It should be readily apparent from the aforenoted description that a number of embodiments of the invention have been disclosed, each of which provides a compact highly effective arrangement for three wheel vehicles. Although three wheel vehicles have been disclosed, it should be understood that some facts of the invention may be used in conjunction with vehicles having different numbers of wheels. In each embodiment, a very robust trailing arm suspension is provided that permits off the road use under extreme conditions. Either chain or shaft drives have been disclosed and in conjunction with chain drive embodiments, various trailing arm arrangements have been disclosed which employ strong trailing arm arrangements. In addition, the suspension element is supported in such a way that it will not encroach on the other vehicle components and which will, nevertheless, permit a large stroke of movement. The suspension arrangement also provides for compensation for unequal weight in the event a shaft drive is employed with the drive shaft offset to one side of the vehicle. Furthermore, an improved trailer hitch arrangement is disclosed wherein the trailer loads are transmitted directly to the vehicle wheels independently of the vehicle suspension system. As a result, handling is significantly improved. Although a number of embodiments of the invention have been disclosed, it should be readily apparent to those skilled in the art that various changes and modifications may be made, without departing from the spirit and scope of the invention as defined by the appended claims.

I claim:

1. In a wheeled off the road vehicle comprising frame means, a single seat carried by said frame means, at least one front wheel supported by said frame means for steering movement, a pair of rear wheels carrying balloon tires, and trailing arm means for supporting said rear wheels for rotation at the rear end of said trailing arm means, said trailing arm means comprising a pair of transversely spaced apart arm members, an engine fixed relative to said frame means, the improvement comprising said frame means defining a pair of transversely spaced apart pivot means positioned contiguous to the outer periphery of said vehicle for pivotally supporting the forwardmost portion of said arm members about widely spaced pivot points for imparting stability to said vehicle, a drive shaft driven by said engine and extending in parallel relation to said arm members, means for permitting said drive shaft to pivot relative to said frame means upon pivotal movement of said trailing arm means, and means for driving said rear wheels from said drive shaft.

2. In a vehicle as set forth in claim 1 wherein the drive shaft extends through and is journalled by one of the arm members.

3. In a vehicle as set forth in claim 2 wherein the means for permitting the drive shaft to pivot relative to the frame means include universal joint means in said drive shaft and positioned with one of its pivot axis in alignment with the pivot means of the respective arm member.

4. In a vehicle as set forth in claim 3 further including suspension means operatively interposed between the trailing arm means and the frame means for yieldably resisting movement of the rear wheels relative to said frame means.

5. In a vehicle as set forth in claim 4 wherein the suspension means comprises a single suspension element operatively interposed between the trailing arm means and the frame means.

6. In a vehicle as set forth in claim 4 wherein the single suspension element has its line of action disposed at a relatively shallow angle to the horizontal.

7. In a vehicle as set forth in claim 1 further including an engine and transmission means carried by the frame means for powering the vehicle, said engine being positioned with its output shaft extending transversely to the longitudinal axis of the vehicle, said transmission comprising a primary shaft and a secondary shaft each supported for rotation about an axis that extends parallel to the engine output shaft axis.

8. In a vehicle as set forth in claim 7 wherein the secondary shaft of the transmission drives a bevel gear and further including a drive shaft having a bevel gear engaged with said secondary shaft bevel gear for driving the rear wheels.

9. In a vehicle as set forth in claim 8 wherein the drive shaft extends through and is journalled by one of the arm members.

10. In a vehicle as set forth in claim 9 further including universal joint means in said drive shaft and positioned with one of its pivot axis in alignment with the pivot means of the respective arm member.

11. In a vehicle as set forth in claim 10 further including a suspension means operatively interposed between the trailing arm means and the frame means for yieldably resisting movement of the rear wheels relative to said frame means.

12. In a vehicle as set forth in claim 11 wherein the suspension means comprises a single suspension element operatively interposed between the trailing arm means and the frame means.

13. In an off the road vehicle or the like comprising frame means, a single seat carried by said frame means, at least one front wheel carrying a balloon tire dirigibly supported by said frame means, a pair of rear wheels carrying balloon tires, suspension means for suspending said rear wheels for movement relative to said frame means, an engine fixed relative to said frame means ahead of said rear wheels, an induction system for said engine including an air cleaner disposed to the rear of said engine and in longitudinal alignment with said rear wheels, the improvement comprising said suspension means comprising a single cushioning element, said cushioning element and said air cleaner being disposed adjacent to each other and disposed and configured to allow full suspension travel of said rear wheels without interference.

14. In a vehicle as set forth in claim 13 wherein the cushioning element comprises a combined shock absorber and coil spring assembly.

15. In a vehicle as set forth in claim 14 wherein the rear wheel suspension means further includes a trailing arm assembly rotatably journalling the rear wheels and pivotally connected to the frame means, the cushioning element being operatively interposed between said trailing arm means and said frame means.

16. In a vehicle as set forth in claim 15 wherein the trailing arm means comprises a pair of spaced apart arm members pivotally connected at their forward end to the frame means.

17. In a vehicle as set forth in claim 16 wherein the pivot axes of the trailing arm means to the frame is spaced transversely a distance substantially equal to the width of the vehicle for lending stability to the vehicle.

18. In a three wheel vehicle comprising frame means, a front wheel dirigibly supported by said frame means, a pair of rear wheels, suspension means for suspending said rear wheels for movement relative to said frame means, the improvement comprising said suspension means comprising at least one cushioning element operating along an axis that is disposed at a relatively shallow angle to the ground when said vehicle is unladened.

19. In a three wheel vehicle as set forth in claim 18 wherein the cushioning element comprises a combined shock absorber and coil spring assembly.

20. In a three wheel vehicle as set forth in claim 19 wherein the cushioning element is offset slightly to one side of the longitudinal axis of the vehicle and comprises the only cushioning element for the rear wheels.

21. In a three wheel vehicle as set forth in claim 18 wherein the rear wheel suspension means further includes a trailing arm assembly rotatably journalling the rear wheels and pivotally connected to the frame means, the cushioning element being operatively interposed between said trailing arm means and said frame means.

22. In a three wheel vehicle as set forth in claim 21 wherein the trailing arm means comprises a pair of spaced apart arm members pivotally connected at their forward end to the frame means.

23. In a three wheel vehicle as set forth in claim 22 wherein the pivot axes of the trailing arm means to the frame is spaced transversely a distance substantially equal to the width of the vehicle for lending stability to the vehicle.

24. In a three wheel vehicle as set forth in claim 23 wherein the cushioning element comprises a combined shock absorber and coil spring assembly.

25. In a three wheel vehicle as set forth in claim 24 wherein the cushioning element is offset slightly to one side of the longitudinal axis of the vehicle and comprises the only cushioning element for the rear wheels.

26. In a drive arrangement for a wheeled vehicle having frame means, an engine supported by said frame means, a pair of rear wheels, and a trailing arm suspension means for suspending said rear wheels from said frame means and comprising a pair of spaced apart arm members pivotally supported by said frame means, the improvement comprising a change speed transmission carried by said frame means and having its primary and secondary shafts extending transversely to the longitudinal axis of said vehicle, a drive shaft extending through one of said trailing arm members, final drive transferring drive from said drive shaft to said rear wheels, and means for driving said drive shaft from said transmission secondary shaft including a universal joint positioned in alignment with the pivot axis of one of said arm members.

27. In a drive arrangement as set forth in claim 26 wherein the final drive means comprises a ring and pinion gear.

28. In a drive arrangement as set forth in claim 27 wherein the ring and pinion gear is contained within a housing that rotatably supports the rear wheels and which forms a portion of the trailing arm means.

29. In a wheeled vehicle comprising frame means, an engine supported by said frame means, a pair of rear wheels, drive means for driving said rear wheels from said engine including a final drive element extending to one side of the longitudinal axis of said vehicle and suspension means for suspending said rear wheels for movement relative to said frame means, the improvement comprising a single suspension element for cushioning the movement of said rear wheels relative to said frame, said single suspension element being offset from the longitudinal axis of the vehicle on the side opposite to the final drive element.

30. In a wheeled vehicle as set forth in claim 29 wherein the final drive element comprises a drive shaft.

31. In a wheeled vehicle as set forth in claim 30 wherein the suspension means comprises a trailing arm suspension having a pair of spaced apart arm members, the drive shaft being rotatably journalled within one of said arm members.

32. In a wheeled vehicle as set forth in claim 31 wherein the single suspension element comprises a combined coil spring and shock absorber.

33. In a wheeled vehicle as set forth in claim 32 wherein the line of action of the coil spring and shock absorber is disposed at a relatively shallow angle to the horizontal.

34. In a three wheel vehicle comprising frame means, a front wheel supported by said frame means for steering movement, a pair of rear wheels, and trailing arm means for supporting said rear wheels for rotation at the rear end of said trailing arm means, said trailing arm means comprising a pair of transversely spaced apart arm members, the improvement comprising said frame means defining a pair of transversely spaced apart pivot means positioned contiguous to the outer periphery of said vehicle for pivotally supporting the forwardmost portion of said arm members about widely spaced pivot points for imparting stability to said vehicle, an engine supported by said frame means and driving said rear wheels through a drive shaft, said drive shaft extending through and journalled by one of the arm members, universal joint means in said drive shaft and positioned with one of its pivot axis in alignment with the pivot means of the respective arm member, and a single suspension element operatively interposed between the trailing arm means and the frame means for yieldably resisting movement of the rear wheels relative to said frame means and offset from the longitudinal axis of the vehicle on the side opposite to the side on which the arm member that contains the drive shaft is located.

35. In a three wheel vehicle as set forth in claim 34 wherein the single suspension element has its line of action disposed at a relatively shallow angle to the horizontal.

36. In a three wheel vehicle comprising frame means, a front wheel supported by said frame means for steering movement, a pair of rear wheels, and trailing arm means for supporting said rear wheels for rotation at the rear end of said trailing arm means, said trailing arm means comprising a pair of transversely spaced apart arm members, the improvement comprising said frame means defining a pair of transversely spaced apart pivot means positioned contiguous to the outer periphery of said vehicle for pivotally supporting the forwardmost portion of said arm members about widely spaced pivot points for imparting stability to said vehicle, an engine and transmission means carried by said frame means for powering said vehicle, said engine being positioned with its output shaft extending transversely to the longitudinal axis of the vehicle, said transmission comprising a primary shaft and a secondary shaft each supported for rotation about an axis that extends parallel to the engine output shaft axis, said secondary shaft of said transmission driving a bevel gear, a drive shaft having a bevel gear engaged with said secondary shaft bevel gear for driving said rear wheels, said drive shaft extending through and journalled by one of the arm members, universal joint means in said drive shaft and positioned with one of its pivot axis in alignment with the pivot means of the respective arm member, a single suspension element operatively interposed between said trailing arm means and said frame means for yieldably resisting movement of said rear wheels relative to said frame means and offset from the longitudinal axis of said vehicle on the side opposite to the side on which the arm member that contains said drive shaft is located.

37. In a three wheel vehicle as set forth in claim 36 wherein the single suspension element has its line of action disposed at a relatively shallow angle to the horizontal.

38. In an off the road vehicle or the like comprising frame means, a single seat carried by said frame means, at least one front wheel carrying a balloon tire dirigibly supported by said frame means, a pair of rear wheels carrying balloon tires, suspension means for suspending said rear wheels for movement relative to said frame means, the improvement comprising said suspension means comprising at least one cushioning element operating along an axis that is disposed at a relatively shallow angle to the ground when said vehicle is unladened.

39. In a vehicle as set forth in claim 38 wherein the cushioning element comprises a combined shock absorber and coil spring assembly.

40. In a vehicle as set forth in claim 39 wherein the cushioning element is offset slightly to one side of the longitudinal axis of the vehicle and comprises the only cushioning element for the rear wheels.

41. In a vehicle as set forth in claim 38 wherein the rear wheel suspension means further includes a trailing arm assembly rotatably journalling the rear wheels and pivotally connected to the frame means, the cushioning element being operatively interposed between said trailing arm means and said frame means.

42. In a vehicle as set forth in claim 41 wherein the trailing arm means comprises a pair of spaced apart arm members pivotally connected at their forward end to the frame means.

43. In a vehicle as set forth in claim 42 wherein the pivot axes of the trailing arm means to the frame is spaced transversely a distance substantially equal to the width of the vehicle for lending stability to the vehicle.

44. In a three wheel vehicle as set forth in claim 43 wherein the cushioning element comprises a combined shock absorber and coil spring assembly.

45. In a three wheel vehicle as set forth in claim 44 wherein the cushioning element is offset slightly to one side of the longitudinal axis of the vehicle and comprises the only cushioning element for the rear wheels.

* * * * *